(12) United States Patent
Kang et al.

(10) Patent No.: US 7,237,049 B2
(45) Date of Patent: Jun. 26, 2007

(54) MULTIMEDIA/SECURE DIGITAL CARDS AND ADAPTERS FOR INTERFACING USING VOLTAGE LEVELS TO DETERMINE HOST TYPES AND METHODS OF OPERATING

(75) Inventors: Sang-wook Kang, Gyeonggi-do (KR); Sang-bum Kim, Gyeonggi-do (KR); Chang-il Son, Gyeonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 232 days.

(21) Appl. No.: 10/957,501

(22) Filed: Oct. 1, 2004

(65) Prior Publication Data
US 2005/0086434 A1 Apr. 21, 2005

(30) Foreign Application Priority Data
Oct. 2, 2003 (KR) ............ 10-2003-0068614

(51) Int. Cl.
- G06K 17/00 (2006.01)
- G06K 19/07 (2006.01)
- G06F 13/00 (2006.01)
- G06F 9/02 (2006.01)
- G06F 1/24 (2006.01)
- G06F 12/00 (2006.01)
- G06F 3/00 (2006.01)

(52) U.S. Cl. .......... 710/104; 710/301; 711/100; 711/115

(58) Field of Classification Search ........ 710/104, 710/300–302, 63; 711/100, 105, 115; 713/1, 713/300, 340; 365/63; 439/55, 924.1; 323/271; 326/80; 361/679, 737, 760; 709/203
See application file for complete search history.

(56) References Cited

U.S. PATENT DOCUMENTS

| | | | | | |
|---|---|---|---|---|---|
| 5,440,244 | A | * | 8/1995 | Richter et al. | 326/37 |
| 5,634,132 | A | * | 5/1997 | Pearce et al. | 713/300 |
| 5,757,171 | A | * | 5/1998 | Babcock | 323/271 |
| 6,149,319 | A | * | 11/2000 | Richter et al. | 713/300 |
| 6,327,663 | B2 | * | 12/2001 | Isaac et al. | 713/300 |
| 6,424,555 | B1 | * | 7/2002 | Chang | 365/63 |
| 6,691,235 | B1 | * | 2/2004 | Garcia et al. | 713/300 |
| 6,896,523 | B2 | * | 5/2005 | Nishizawa et al. | 439/60 |
| 2003/0046472 | A1 | | 3/2003 | Morrow | |

OTHER PUBLICATIONS

"Design and implementation of a microprocessor based high frequency switching mode power supply" by Sari et al. (abstract only) Publication Date: Sep. 13-16, 1993.*
CM-120 USB 6-in-1 Combo Card Reader Controller Technical Brief, Version 1.1, C-Media Electronics Inc., Mar. 24, 2003, pp. 1-8.

* cited by examiner

Primary Examiner—Gopal C. Ray
(74) Attorney, Agent, or Firm—Myers, Bigel, Sibley & Sajovec, P.A.

(57) ABSTRACT

A Multimedia (MMC)/Secure Digital (SD) form-factor compliant card apparatus can include a mode determining circuit connected to first and second pins of the card apparatus and configured to determine a type of host connected to the first and second pins based on comparing voltages at the first and second pins to an internal voltage level. Related adaptors and methods are also disclosed.

22 Claims, 5 Drawing Sheets

| PIN NO. | MMC MODE | | | SPI MODE | | | USB MODE | | |
|---|---|---|---|---|---|---|---|---|---|
| | NAME | TYPE | DESCRIPTION | NAME | TYPE | DESCRIPTION | NAME | TYPE | DESCRIPTION |
| 201 | RSV | NC | Reserved | CS | — | Chip select | XI | I | Clock Input |
| 202 | CMD | IO | Command/Response | DI | — | Data In | D+ | IO | USB D+ Data |
| 203 | VSS1 | S | Ground | VSS1 | S | Ground | VSS/VDD | S | Power or Ground |
| 204 | VDD | S | Power | VDD | S | Power | VDD | S | Reserved |
| 205 | CLK | I | Clock | SCLK | — | Clock | XO | O | Clock Output |
| 206 | VSS2 | S | Ground | VSS2 | S | Ground | VDD/VSS | S | Power or Ground |
| 207 | DAT | IO | Data | DO | O | Data Out | D− | IO | USB D− Data |

MULTIMEDIA/SECURE DIGITAL CARDS AND ADAPTERS FOR INTERFACING USING VOLTAGE LEVELS TO DETERMINE HOST TYPES AND METHODS OF OPERATING

CROSS REFERENCE TO RELATED APPLICATION

This application claims the priority of Korean Patent Application No. 2003-68614, filed on Oct. 2, 2003, in the Korean Intellectual Property Office, the disclosure of which is hereby incorporated by reference in its entirety.

FIELD OF THE INVENTION

The invention relates to a storage device, and more particularly, to a movable storage device.

BACKGROUND OF THE INVENTION

In general, movable storage devices like multimedia cards (MMC), secure digital (SD) memory cards, compact flash (CF) cards, and memory sticks are used in movable digital devices (i.e. hosts) like camcorders, digital cameras, PDAs (personal digital assistance), and MP3s (MPEG-1 Layer 3). The devices communicate with the hosts in different protocols. Therefore, each movable storage device may only be connected to a host that communicates in a corresponding communication protocol.

Figure 1:
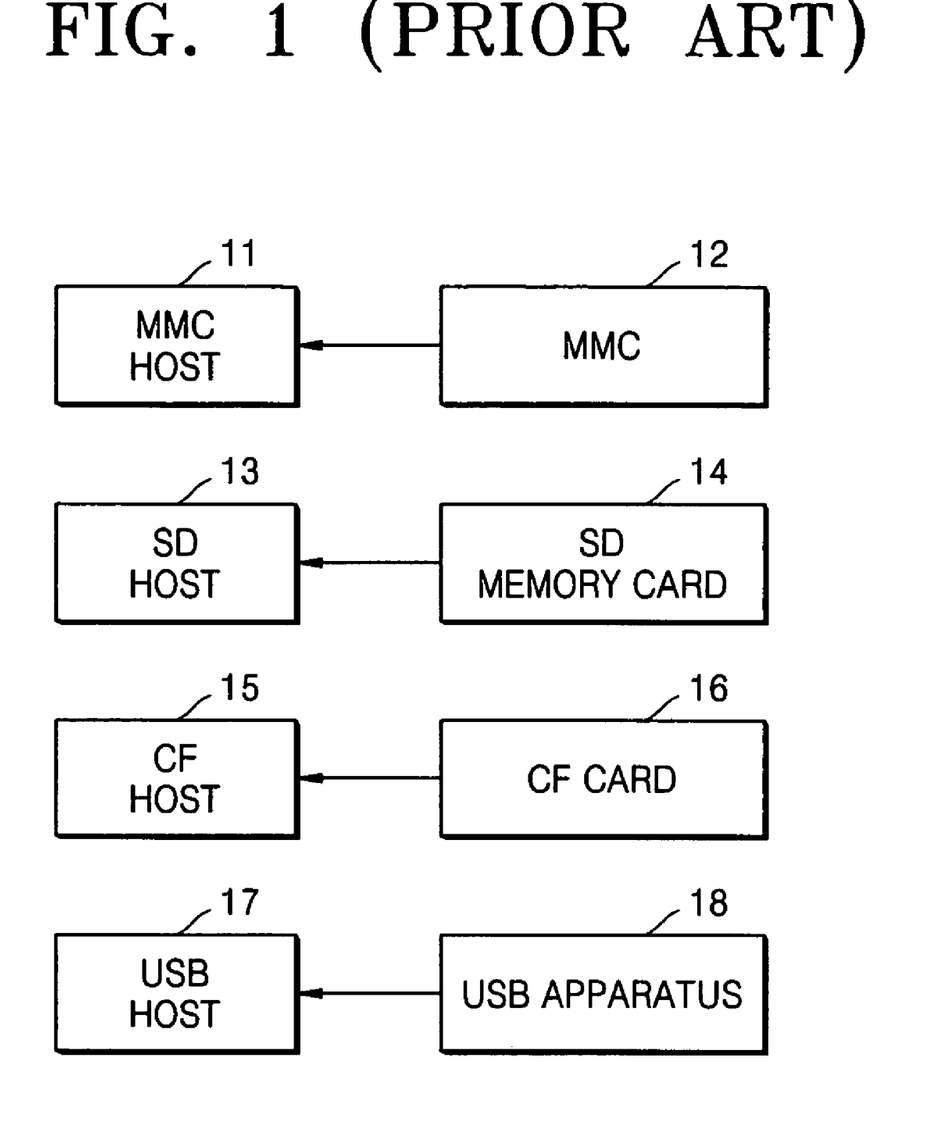
FIG. 1 is a block diagram that illustrate relationships among conventional memory cards and hosts.

Thus, as shown in FIG. 1, for a host that uses a specific protocol, a memory card that supports the specific protocol is used. In other words, a MultiMedia Card (MMC) 12 is used for an MMC host 11, and a Secure Digital (SD) memory card 14 is used for an SD host 13. Likewise, a Compact Flash (CF) card 16 is used for a CF host 15 and a universal serial bus (USB) apparatus 18 is used for a USB host 17. U.S. Pat. No. 6,388,919 discusses such card-type flash memory devices.

In order for a mobile storage device to be used with a host that has a specification different from that of the mobile storage device, the mobile storage device should have a specification that is in accordance with the host, have an interface apparatus dedicated for the host, or have an additional device that converts its communication protocol into a communication protocol of the host.

Although an interface function may be provided for the host or an additional device may be used in the mobile storage device, the mobile storage device may need to recognize the host type and determine an operation mode for interfacing the host. It is known to include an additional signal pin on the mobile storage device wherein the host outputs a control signal used for determining the operation mode for interfacing the host through the signal pin. However, this approach may increase the number of signal pins on the mobile storage device and may require that the host output the control signal to the mobile storage device.

SUMMARY

Embodiments according to the invention can provide multimedia/secure digital cards and adapters for interfacing to hosts and methods of operating. Pursuant to these embodiments, a Multimedia (MMC)/Secure Digital (SD) form-factor compliant card apparatus can include a mode determining circuit connected to first and second pins of the card apparatus and configured to determine a type of host connected to the first and second pins based on comparing voltages at the first and second pins to an internal voltage level.

In some embodiments according to the invention, the mode determining circuit can be configured to determine the type of host by comparing a difference between a first voltage at the first pin and a second voltage at the second pin to the internal voltage level. In some embodiments according to the invention, the mode determining circuit is further configured to enable an MMC controller to interface the card apparatus to the host responsive to determining that the difference is not equal to the internal voltage level. The mode determining circuit is further configured to enable a USB controller to interface the card apparatus to the host responsive to determining that the difference is about equal to the internal voltage level. In some embodiments according to the invention, the internal voltage level comprises a VDD voltage level.

In some embodiments according to the invention, the mode determining circuit is further configured to determine the type of host by comparing at least one of a first voltage at the first pin to and a second voltage at the second pin to the internal voltage level. In some embodiments according to the invention, the mode determining circuit is further configured to enable an MMC controller to interface the card apparatus to the host responsive to determining that the first and second voltages are not equal to the internal voltage level. The mode determining circuit is further configured to enable a USB controller to interface the card apparatus to the host responsive to determining that the first or second voltage is about equal to the internal voltage level.

In some embodiments according to the invention, a Multimedia (MMC)/Secure Digital (SD) form-factor compliant card apparatus can include an internal switching circuit, a memory controller, an MMC controller, a USB controller, and a mode determining circuit. The internal switching circuit connected to pins of the card apparatus and configured to provide/receive signals to/from the pins based on a type of host connected to the pins. The memory controller circuit can be configured to store/retrieve data in a non-volatile memory. The MMC controller can be connected to the internal switching circuit and to the memory controller and configured to receive/provide data from/to the host according to an MMC standard. The USB controller can be connected to the internal switching circuit and to the memory controller and configured to receive/provide data from/to the host according to a USB standard. The mode determining circuit can be connected to first and second pins of the card apparatus and configured to enable the internal switching circuit according to the type of the host and configured to enable the MMC controller or the USB controller based on comparing voltages at the first and second pins to an internal voltage level.

In some embodiments according to the invention, a Universal Serial Bus adapter for a Multimedia (MMC)/Secure Digital (SD) form-factor compliant card apparatus can include a plurality of first pins and a plurality of second pins. The plurality of first pins configured for re-moveable insertion of a USB complaint host to provide/receive signals to/from the host according to a USB protocol. The plurality of second pins can be connected to the plurality of first pins and configured for re-moveable insertion of an MMC/SD form-factor complaint card apparatus to provide signals to/from the card apparatus according to an MMC/SD protocol. The adapter can be further configured to provide an internal voltage to a first pin of the plurality of second pins and to provide a reference voltage to a second and a third pin of the plurality of second pins according to an MMC protocol and configured to provide the internal voltage level to the second or the third pin of the plurality of second pins according to the USB protocol. In some embodiments according to the invention, the first pin comprises a reserved pin when the card apparatus operates according to the USB protocol.

In some embodiments according to the invention, a method for interfacing a host to a Multimedia (MMC)/Secure Digital (SD) form-factor compliant card can include determining a type of host connected to first and second pins of the MMC/SD form-factor compliant card based on comparing voltages at the first and second pins to an internal voltage level.

In some embodiments according to the invention, the determining can include comparing a first voltage at the first pin to a second voltage at the second pin to provide a difference therebetween and comparing the difference to the internal voltage level. In some embodiments according to the invention, the method can further include enabling an MMC controller to interface the card to the host responsive to determining that the difference is not equal to the internal voltage level. A USB controller can be enabled to interface the card to the host responsive to determining that the difference is about equal to the internal voltage level.

In some embodiments according to the invention, the determining can include determining the type of host by comparing at least one of a first voltage at the first pin to and a second voltage at the second pin to the internal voltage level. In some embodiments according to the invention, the method can further include enabling an MMC controller to interface the card to the host responsive to determining that the first and second voltages are not equal to the internal voltage level. A USB controller can be enabled to interface the card to the host responsive to determining that the first or second voltage is about equal to the internal voltage level.

DETAILED DESCRIPTION OF EMBODIMENTS ACCORDING TO THE INVENTION

The invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or connected to the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "form-factor" means the physical size and shape of the memory card. Moreover, the form-factor of memory cards according to some embodiments of the invention is described herein as a Multi-Media Card (MMC)/Secure Digital memory card that has a size and shape that allows such memory cards to be used with other compliant devices, such as readers. As known to those skilled in the art, SD represents a later developed version of the MMC standard, which may allow MMC compliant memory cards to be used with SD compliant devices. In some embodiments according to the invention, MMC/SD form-factor compliant devices measure about 32 mm×about 24 mm×about 1.4 mm. The MMC and SD standards are discussed further on the world-wide-web at "www.mmca.org."

Figure 2:
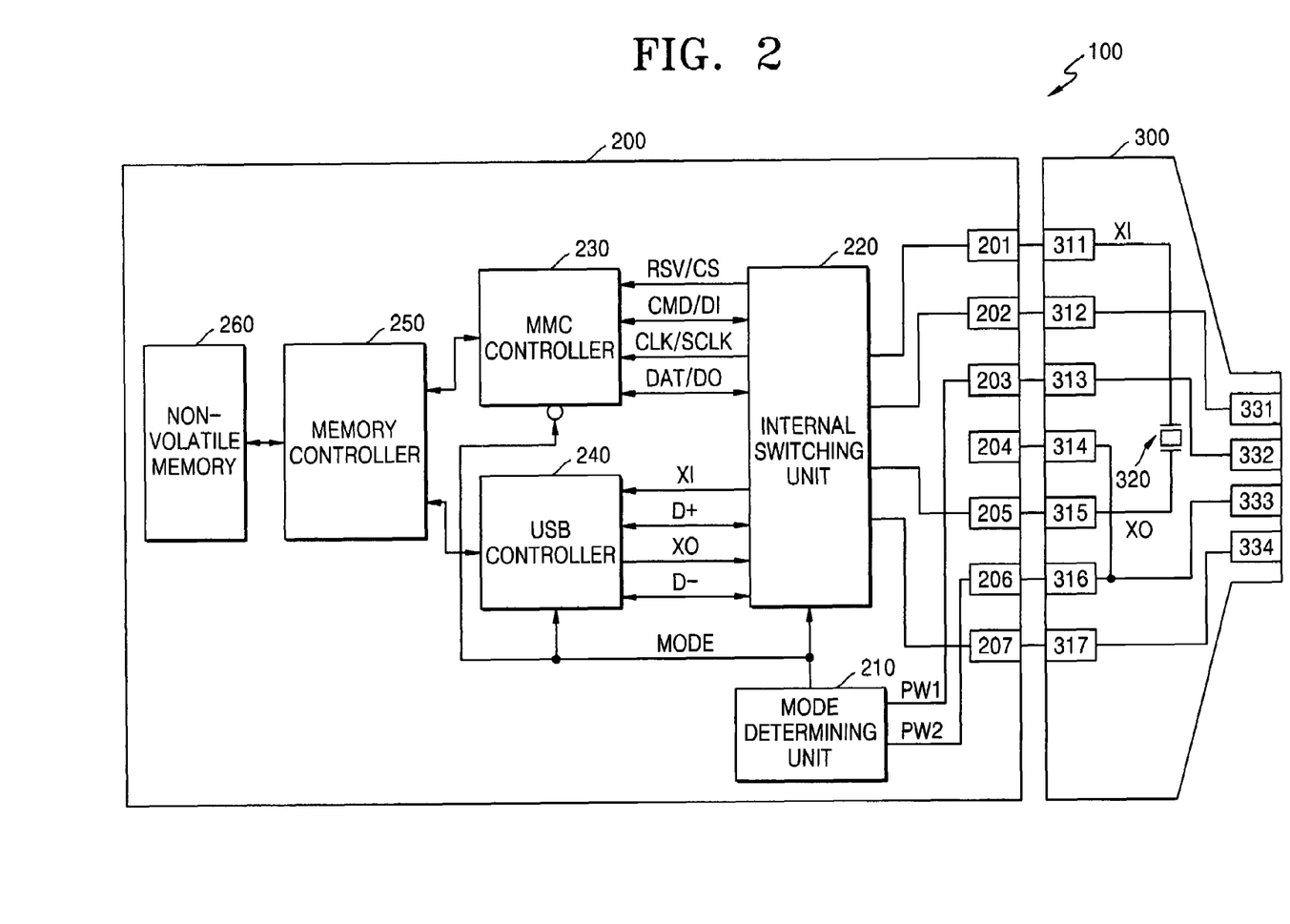
FIG. 2 is a block diagram that illustrates an MMC apparatus according to some embodiments of the present invention.

FIG. 2 illustrates an MMC apparatus 100 according to some embodiments of the invention. The MMC apparatus 100 includes a Multimedia form factor compliant Card (or MMC) 200 and a USB adapter 300. In some embodiments according to the invention, the MMC 200 may be other types of memory cards (e.g. Secure Digital or SD cards) that communicate using an MMC specification and are capable of reading data from or writing data to non-volatile memories. It will also be understood that the USB adapter 300 and the MMC 200 may be used separately in different applications.

In some embodiments according to the invention, the MMC 200 includes pins (or signal pins) 201 through 207, a mode determining unit (or circuit) 210, an internal switching unit (or circuit) 220, an MMC controller 230, a USB controller 240, a memory controller 250, and a non-volatile memory 260. Also, the USB adapter 300 includes MMC signal pins 311 through 317, a crystal oscillator 320, and USB signal pins 331 through 334.

The pins 203, 204, and 206 are power pins, which are shared (or used by both) by the MMC controller 230 and the USB controller 240. When the MMC 200 is connected to an MMC host or USB host, a reference (or ground) voltage VSS is provided to the pins 203 and 206 and an internal (or power) voltage VDD is provided to the pin 204. In some embodiments according to the invention, the internal voltage VDD is a voltage level provided to the MMC card for use as a power supply for operations thereof and can be any voltage level that is suitable to power cards of this type.

Also, the pins 201, 202, 205, and 207 may have different usages where the MMC 200 is connected to the MMC host and where the MMC 200 is connected to a USB host. The MMC controller 230 and the USB controller 240 share access to the pins 201, 202, 205, and 207 via the internal switching unit (or circuit) 220.

The specification of the MMC 200 will be described with reference to FIG. 3. When the MMC 200 is connected to the MMC host, the pin 201 is not used in an MMC mode (RSV) and used as a pin for a chip selection signal (CS) in an SPI mode. The pin 202 is used for a command signal (CMD) in the MMC mode and for an input data signal (DI) in the SPI mode. Also, the pins 205 and 207 are used for a clock signal (CLK) and a data signal (DAT) in the MMC mode and for a clock signal (SCLK) and an output data signal (DO) in the SPI mode.

When the MMC 200 is connected to the USB host through the USB adapter 300, the pin 201 is used to receive an input oscillation signal XI from the crystal oscillator 320. The pin 202 is used for an input data signal D+, and the pin 205 is used for outputting an output oscillation signal XO to the crystal oscillator 320. The pin 207 is used for an input data signal D−. When the MMC 200 is connected to the MMC host or is connected to the USB host through the USB adapter 300, the pins 201, 202, 205, and 207 can be used for different signals.

Figure 3:
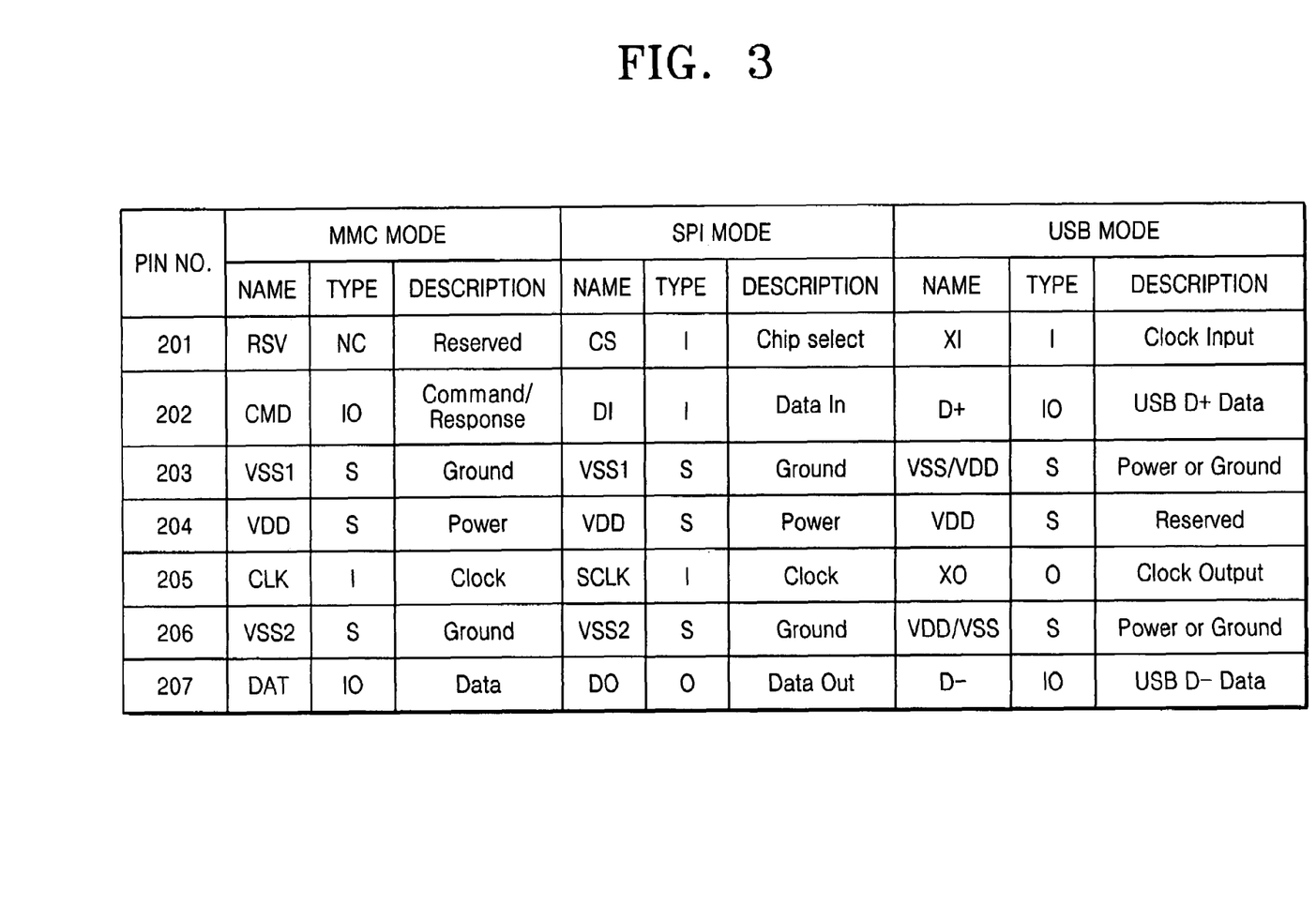
FIG. 3 illustrates a table showing a specification of the MMC apparatus of FIG. 2.

As shown in FIG. 3, a voltage provided to one of the pins 203 and 206 when the MMC 200 is in the MMC (and/or SPI) mode is different than a voltage provided to the same pin when the MMC 200 is in the USB mode. In other words, when the MMC 200 is in the MMC/SPI mode, the ground voltage VSS is provided to both of the pins 203 and 206. In contrast, when the MMC 200 is in the USB mode, the ground voltage VSS is provided to one of the pins 203 and 206 and the internal voltage VDD is provided to the other one of the pins 203 and 206, through the USB adapter 300.

When the MMC 200 is connected to the MMC host or the USB host through the USB adapter 300, the mode determining unit 210 determines voltage levels of power voltages PW1 and PW2 present on the pins 203 and 206 to determine the type of host (either MMC or USB). The mode determining unit 210 outputs a mode control signal MODE to the MMC controller 230 and to the USB controller 240 based on the result to enable whichever controller is associated with the type of the host.

In some embodiments according to the invention, the mode determining unit 210 determines that the MMC 200 is connected to the USB host when one of the power voltages PW1 and PW2 is at a level of the internal voltage VDD, whereas the mode determining unit 210 determines that the MMC 200 is connected to the MMC host when the power voltages PW1 and PW2 are both at a level of the ground voltage VSS. In some embodiments according to the invention, the mode determining unit 210 determines that the host is USB if one of the power voltages PW1 and PW2 is at a level of the internal voltage VDD, and that the other of the power voltages PW1 and PW2 is at a level of the ground voltage VSS. In some embodiments according to the invention, the mode determining unit 210 determines a difference between the voltage levels on the power voltages PW1 and PW2 as a basis for determining which type of host is present. For example, if the voltage difference between the power voltages PW1 and PW2 is about zero volts (i.e., the voltage levels of the power voltages PW1 and PW2 are about equal) the mode determining unit 210 determines that the MMC is connected to an MMC host. However, if the voltage difference between the power voltages PW1 and PW2 is equal to about +/−VDD volts (i.e., the voltage levels of the power voltages PW1 and PW2 are different by about the difference between VDD and VSS) the mode determining unit 210 determines that the MMC 200 is connected to a USB host.

The internal switching unit 220 connects one of the MMC controller 230 and the USB controller 240 to the pins 201, 202, 205, and 207 in response to the mode control signal MODE. The MMC controller 230 is enabled or disabled in response to the mode control signal MODE. The MMC controller 230 communicates with the MMC host in the MMC mode and the USB controller 240 communicates with the USB host through the USB adapter 300 in the USB mode.

The memory controller 250 transmits data to and receives data from the MMC controller 230 in the MMC mode and the USB controller 240 in the USB mode. Also, the memory controller 250 controls read, write, and erase operations to the non-volatile memory 260.

When the MMC 200 is connected to the USB host through the USB adapter 300, the MMC signal pins 311 through 317 of the USB adapter 300 are connected to the pins 201 through 207 in a one-to-one correspondence. The USB signal pins 331 through 334 are connected to pins of the USB host in a one-to-one correspondence.

The USB signal pin 331 is internally connected to the MMC signal pin 312 and is used for the input data signal D+. The USB signal pin 332 is internally connected to the MMC signal pin 313 and is used for providing the ground voltage VSS. The USB signal pin 333 is internally connected to the MMC signal pins 314 and 316 and is used for providing the internal voltage VDD. Alternatively, the USB signal pin 332 may be used for providing the internal voltage VDD, and the USB signal pin 333 may be used for providing the ground voltage VSS. In this case, the USB signal pin 332 is internally connected to the MMC signal pins 313 and 314 and the USB signal pin 333 is internally connected to the MMC signal pin 316.

Also, the USB signal pin 335 is internally connected to the MMC signal pin 317 and is used as a pin for the input data signal (D−). The crystal oscillator 320 receives the output oscillation signal XO through the MMC signal pin 315 and outputs the input oscillation signal XI to the MMC signal pin 311. When the MMC 200 is connected to the USB host through the USB adapter 300, the USB adapter 300 provides the internal voltage VDD to one of the pins 203 and 206 of the MMC 200.

Figure 4:
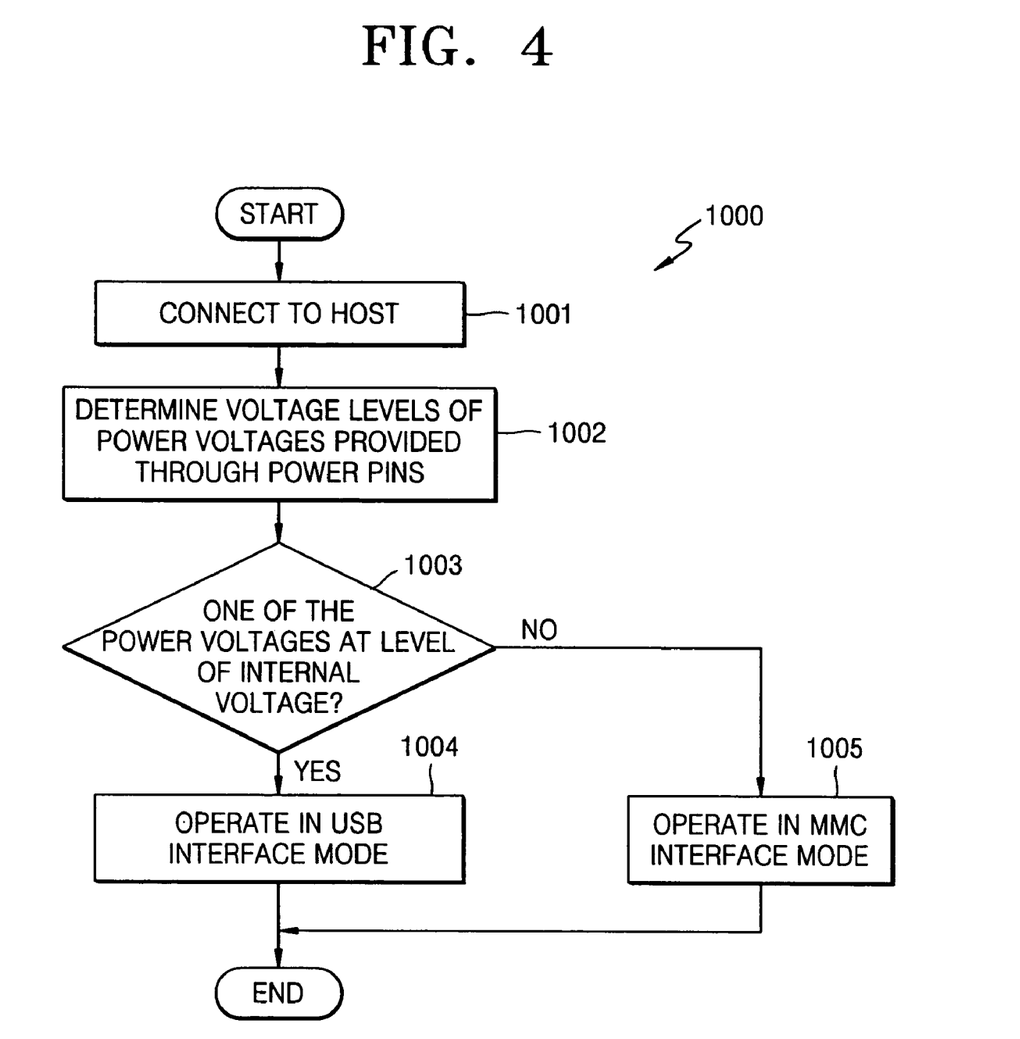
FIG. 4 is a flowchart illustrating an interfacing procedure of the MMC apparatus, according to an embodiment of the present invention.

An interfacing procedure of the MMC apparatus 100, according to some embodiments of the present invention, is explained with reference to FIGS. 2 through 4. FIG. 4 is a flowchart illustrating the interfacing procedure of the MMC apparatus 100, according to some embodiments of the invention. In FIG. 4, the SPI mode of the MMC 200 is understood by those skilled in the art and will not be described herein. Thus, in FIG. 4, the descriptions will focus on the MMC mode and USB mode of the MMC 200.

At block 1001, the MMC 200 is connected to the MMC host or to the USB host through the USB adapter 300. At block 1002, the mode-determining unit 210 of the MMC 200 determines the voltage levels of the power voltages PW1 and PW2 provided to the pins 203 and 206. At block 1003, the mode-determining unit 210 determines whether one of the power voltages PW1 and PW2 is at the level of the internal voltage VDD. If one of the power voltages PW1 and PW2 is at the level of the internal voltage VDD and the other of the power voltages PW1 and PW2 is at the level of the ground voltage VSS, the mode determining unit 210 recognizes a connected host type as the USB host and enables the mode control signal MODE. In some embodiments according to the invention, the mode determining unit 210 determines the difference between the power voltages PW1 and PW2 provided to the pins 203 and 206. In some embodiments according to the invention, the mode determining unit 210 determines the voltage level of one of the power voltages PW1 and PW2 and may determine the voltage level at the other of the power voltages PW1 and PW2 if the voltage level of the one is equal to the reference (or ground) voltage VSS (otherwise the mode determining unit 210 may not determine the other voltage level as the one voltage level may be determinative of the type of host).

When the mode control signal MODE is enabled, the internal switching unit 220 connects the USB controller 240 to the pins 201, 202, 205, and 207. Also, in response to the mode control signal MODE, the USB controller 240 is enabled and the MMC controller 230 is disabled. Thereafter, at block 1004, the MMC 200 operates in a USB interface mode by the USB controller 240.

In some embodiments according to the invention, when the power voltages PW1 and PW2 both are at the level of the ground voltage VSS, the mode determining unit 210 recognizes a connected host type as the MMC host and disables the mode control signal MODE. At this time, the MMC 200 is connected to the MMC host without being connected through the USB adapter 300.

When the mode control signal MODE is disabled, the internal switching unit 220 connects the MMC controller 230 to the pins 201, 202, 205, and 207. Also, in response to the mode control signal MODE, the MMC controller 230 is enabled and the USB controller 240 is disabled. Thereafter, at block 1005, the MMC 200 operates in an MMC interface mode using the MMC controller 230. As described above, since the MMC apparatus according of the invention recognizes a connected host type based on the voltage level of power pins, it may not be necessary to include additional pins to determine the type of host.

Figure 5:
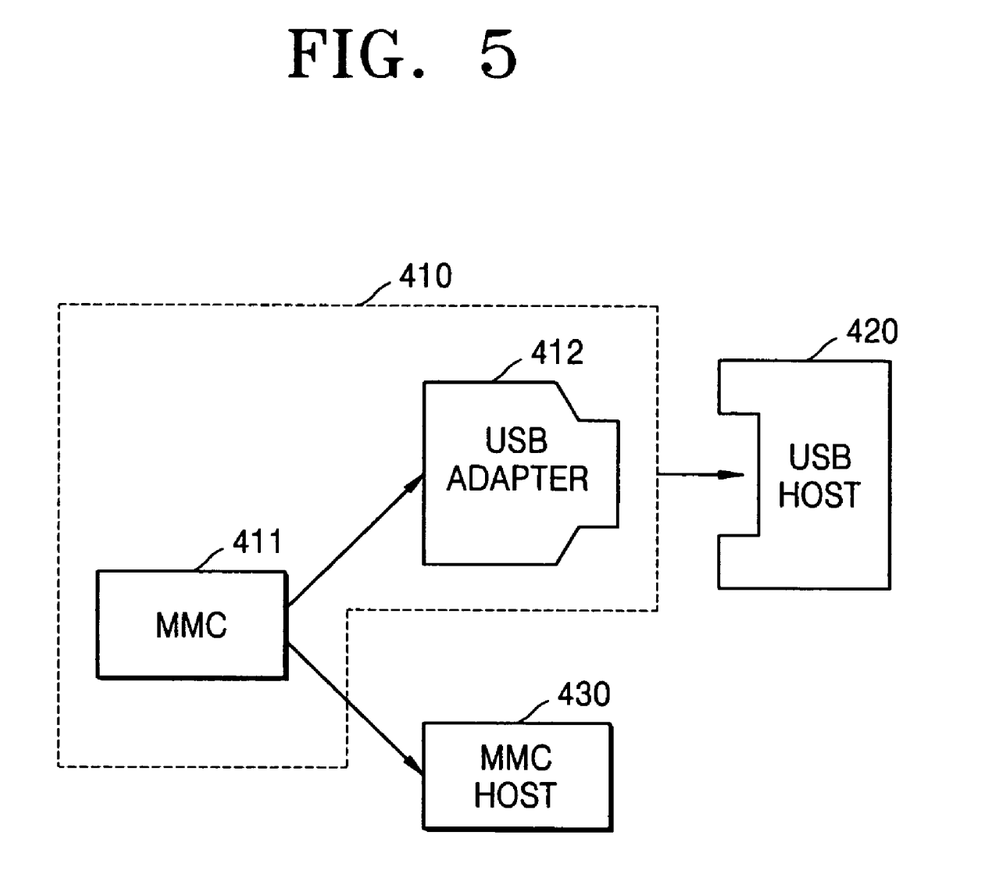
FIG. 5 is a conceptual view illustrating the relationship among the MMC apparatus, a USB host, and an MMC host, according to the present invention.

As shown in FIG. 5, an MMC 411 can be conveniently used in a USB host 420 through a USB adapter 412 as well as an MMC host 430. Therefore, according to the MMC apparatus and the interfacing method performed in the MMC apparatus, it is possible to recognize a connected host type without the need for additional pins or an external control signal for determining an operation mode.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed:

1. A Multimedia (MMC)/Secure Digital (SD) form-factor compliant card apparatus comprising:

an internal switching circuit connected to pins of the card apparatus and configured to provide/receive signals to/from the pins based on a type of host connected to the pins;

a memory controller configured to store/retrieve data in a non-volatile memory;

an MMC controller connected to the internal switching circuit and to the memory controller and configured to receive/provide data from/to the host according to an MMC standard;

a USB controller circuit connected to the internal switching circuit and to the memory controller and configured to receive/provide data from/to the host according to a USB standard; and a mode determining circuit connected to first and second pins of the card apparatus and configured to enable the internal switching circuit according to the type of the host and configured to enable the MMC controller or the USB controller based on comparing voltages at the first and second pins to an internal voltage level.

2. An apparatus according to claim 1 wherein the mode determining circuit is configured to determine the type of host by comparing a difference between a first voltage at the first pin and a second voltage at the second pin to the internal voltage level.

3. An apparatus according to claim 1 wherein the mode determining circuit is further configured to determine the type of host by comparing at least one of a first voltage at the first pin to and a second voltage at the second pin to the internal voltage level.

4. An apparatus according to claim 1 wherein the mode determining circuit is further configured to enable the MMC controller to interface the card apparatus to the host responsive to determining that the first and second voltages are not equal to the internal voltage level and configured to enable the USB controller to interface the card apparatus to the host responsive to determining that the first or second voltage is about equal to the internal voltage level.

5. A Universal Serial Bus adapter for a Multimedia (MMC)/Secure Digital (SD) form-factor compliant card apparatus comprising:

a plurality of first pins configured for re-moveable insertion of a USB complaint host to provide/receive signals to/from the host according to a USB protocol; and a plurality of second pins connected to the plurality of first pins and configured for re-moveable insertion of the MMC/SD form-factor complaint card apparatus to provide signals to/from the card apparatus according to an MMC/SD protocol and further configured to provide an internal voltage to a first pin of the plurality of second pins and to provide a reference voltage to a second and a third pin of the plurality of second pins according to an MMC protocol and configured to provide the internal voltage to the second or the third pin of the plurality of second pins according to the USB protocol.

6. An apparatus according to claim 5 wherein the first pin comprises a reserved pin when the card apparatus operates according to the USB protocol.

7. A method for interfacing a host to a Multimedia (MMC)/Secure Digital (SD) form-factor compliant card comprising:

determining a type of host connected to first and second pins of the MMC/SD form-factor compliant card based on comparing voltages at the first and second pins to an internal voltage level.

8. A method according to claim 7 wherein determining comprises:
comparing a first voltage at the first pin to a second voltage at the second pin to provide a difference there between; and
comparing the difference to the internal voltage level.

9. A method according to claim 7 further comprising:
enabling an MMC controller to interface the card to the host responsive to determining that the difference is not equal to the internal voltage level; and
enabling a USB controller to interface the card to the host responsive to determining that the difference is about equal to the internal voltage level.

10. A method according to claim 7 wherein the internal voltage level comprises a VDD voltage level.

11. A method according to claim 7 wherein determining comprises determining the type of host by comparing at least one of a first voltage at the first pin to and a second voltage at the second pin to the internal voltage level.

12. A method according to claim 11 further comprising:
enabling an MMC controller to interface the card to the host responsive to determining that the first and second voltages are not equal to the internal voltage level; and
enabling a USB controller to interface the card to the host responsive to determining that the first or second voltage is about equal to the internal voltage level.

13. A multimedia card (MMC) apparatus comprising:
an MMC, which operates in an MMC mode or a universal serial bus (USB) mode according to voltage levels of power voltages provided to power pins when being connected to one of an MMC host and a USB host; and
a USB adapter, which interfaces the MMC and the USB host and provides an internal voltage to one of the power pins when the MMC is connected to the USB host.

14. The MMC apparatus of claim 13, wherein the MMC comprises:
at least one non-volatile memory, which stores data;
a plurality of signal pins including the power pins;
a mode-determining unit, which determines the voltage levels of the power voltages provided to the power pins and outputs a mode control signal based on a determination result;
an MMC controller, which is enabled or disabled in response to the mode control signal and communicates with the MMC host in the MMC mode;
a USB controller, which is enabled or disabled in response to the mode control signal and communicates with the USB host through the USB adapter in the USB mode;
an internal switching unit, which connects one of the MMC controller and the USB controller in response to the mode control signal to the plurality of signal pins; and
a memory controller, which communicates with one of the enabled MMC controller and the USB controller and controls data read, write, and erase operations of the non-volatile memory.

15. The MMC apparatus of claim 14, wherein the MMC controller and the USB controller share the plurality of signal pins.

16. The MMC apparatus of claim 14, wherein the USB adapter comprises:
MMC signal pins, which are connected to the plurality of signal pins in a one-to-one correspondence;
a crystal oscillator, which outputs an oscillation signal to the MMC through some of the MMC signal pins; and
USB signal pins, which are internally connected to the remaining MMC signal pins and are connected to the signal pins of the USB host in a one-to-one correspondence.

17. The MMC apparatus of claim 16, wherein the plurality of signal pins comprises:
a first power pin to which the internal voltage is provided in the MMC mode and the USB mode;
second power pins to which a ground voltage is provided in the MMC mode and the internal voltage and the ground voltage are provided respectively in the USB mode;
a first signal pin, which is set as a pin for a command signal in the MMC mode and a pin for a first USB data signal in the USB mode;
a second signal pin, which is set as a pin for an MMC data signal in the MMC mode and a pin for a second USB data signal in the USB mode;
a third signal pin, which is not used in the MMC mode and is set as a pin for a first oscillation signal in the USB mode; and
a fourth signal pin, which is set as a pin for a clock signal in the MMC mode and a pin for a second oscillation signal in the USB mode.

18. The MMC apparatus of claim 17, wherein the mode determining unit determines that a connected host type is the MMC host when the power voltage provided to the second power pins are all at a level of the ground voltage and determines that a connected host type is the USB host when one of the power voltages is at a level of the internal voltage.

19. The MMC apparatus of claim 17, wherein the MMC signal pins comprise:
a first MMC signal pin, which corresponds to the first power pin;
second and third MMC signal pins, which correspond to the second power pins; and
fourth through seventh MMC signal pins, which correspond to the first through fourth signal pins, respectively.

20. The MMC apparatus of claim 19, wherein the crystal oscillator is connected between the sixth MMC signal pin and the seventh MMC signal pin, outputs the first oscillation signal to the USB controller through the sixth MMC signal pin and receives the second oscillation signal through the seventh MMC signal pin in the USB mode.

21. The MMC apparatus of claim 20, wherein the USB signal pins comprise:
a first UBS signal pin, which is internally connected to the second MMC signal pin and to which the ground voltage is provided when being connected to the USB host;
a second USB signal pin, which is internally connected to the first MMC signal pin and the third MMC signal pin and to which the internal voltage is provided when being connected to the USB host;
a third USB signal pin, which is internally connected to the fourth MMC signal pin and is used for transmitting and receiving the first USB data signal when being connected to the USB host; and
a fourth USB signal pin, which is internally connected to the fifth MMC signal pin and is used for transmitting and receiving the second USB data signal when being connected to the USB host.

22. The MMC apparatus of claim 20, wherein the USB signal pins comprise:
 a first USB signal pin, which is internally connected to the first MMC signal pin and the second MMC signal pin and to which the internal voltage is provided when being connected to the USB host;
 a second USB signal pin, which is internally connected to the third MMC signal pin and to which the ground voltage is provided when being connected to the USB host;
 a third USB signal pin, which is internally connected to the fourth MMC signal pin and is used for transmitting and receiving the first USB data signal when being connected to the USB host; and
 a fourth USB signal pin, which is internally connected to the fifth MMC signal pin and is used for transmitting and receiving the second USB data signal when being connected to the USB host.

* * * * *